Figure 1:
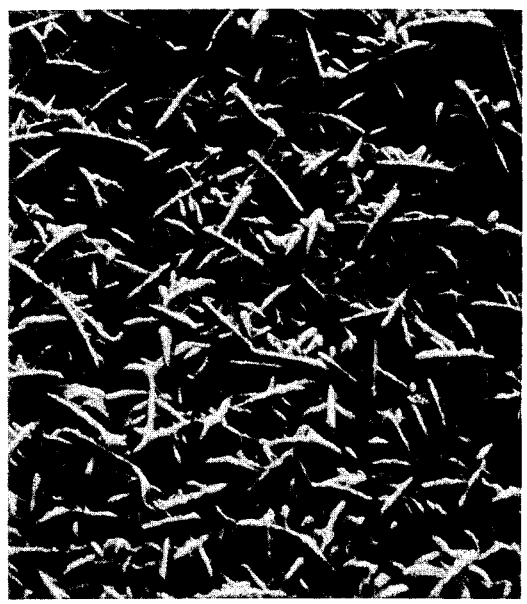

United States Patent [19]

Schmidt

[11] 4,139,426

[45] Feb. 13, 1979

[54] PROCESS FOR THE ELECTROLYTIC FORMATION OF LEAD DIOXIDE SOLAR ABSORPTION COATING

[75] Inventor: Ferenc J. Schmidt, Ardmore, Pa.

[73] Assignee: Ametek, Inc., New York, N.Y.

[21] Appl. No.: 813,533

[22] Filed: Jul. 7, 1977

[51] Int. Cl.$^2$ .............................................. C25D 9/06
[52] U.S. Cl. ....................................... 204/57; 204/42
[58] Field of Search .................................. 204/57, 42

[56] References Cited

U.S. PATENT DOCUMENTS

| 3,668,085 | 6/1972 | Kiyohara et al. | 204/57 |
| 4,026,271 | 5/1977 | Schmidt | 204/40 |

Primary Examiner—R. L. Andrews
Attorney, Agent, or Firm—Miller & Prestia

[57] ABSTRACT

Solar energy collector surface, the effectiveness of which as a collector is relatively independent of incident angle, comprises a textured surface of lead dioxide electrodeposited in such a manner to produce a multiplicity of upwardly protruding platelets. The electrodeposition technique comprises an initial nucleation stage in which a relatively high overpotential is applied for a short period of time and a subsequent oriented growth stage in which a lower overpotential is applied for a longer period of time than in the first stage.

10 Claims, 3 Drawing Figures

PROCESS FOR THE ELECTROLYTIC FORMATION OF LEAD DIOXIDE SOLAR ABSORPTION COATING

This invention relates to solar energy collector surfaces and particularly to improved lead dioxide surfaces and methods for forming same.

Oxygen-deficient lead dioxide solar energy collector surfaces are disclosed and claimed in U.S. Pat. No. 3,958,554, of common inventorship and assignment herewith. Because of the semiconductor properties of that material, including particularly desirable infrared transparency (i.e. low emissivity) and the relatively close match of the bandgap of that material with the peak of the solar energy spectrum, oxygen-deficient lead dioxide is a good absorber of solar radiation. Typically, 90% to 99% solar absorptivity has been measured with coatings of this type, at normal incidence angles.

As with all such coatings, however, the absorptivity is significantly reduced as the incident angles departs from normal, and the literature is replete with techniques and apparatus for maintaining solar energy collector surfaces at close to normal incident angle to compensate for relative movement of sun and earth. The complexity of such systems reduces their cost effectiveness.

An alternative approach is to develop a solar energy collection surface which maintains relatively high efficiency irrespective of the incident angle of light. To that end, J. J. Cuomo, J. M. Woodall, and J. F. Ziegler have developed, published (A New Concept For Solar Energy Thermal Conversion, *Solid State Physics*, Aug. 6, 1974, RC 4974, #22030), and patented (U.S. Pat. 4,005,698, issued Feb. 1, 1977) a solar energy collection surface consisting of a dense array of metal whiskers, such as tungsten, protruding upwardly from the substrate of the collector surface and grown with spacings of a few wavelengths of visible light. Such a surface is said to absorb light with high efficiency because of the multiple reflections of the light as the incident photons penetrate the needle maze, in a manner similar to acoustic absorption by anechoic walls. However, even this material is limited, for absorptive efficiency, to a "narrow incident cone about the needle direction". Moreover, broad band absorption covering the solar spectrum is precluded in that the multiple reflection geometric effect requires the needle to be relatively closely spaced and this in turn excludes penetration of the higher wavelengths as incident angle increases.

A different form of textured surface for high efficiency solar energy absorption has beeen at least theoretically described in the literature by P. B. Clapham and M. C. Hutley ("New Type of Graded-Index Antireflection Coating", *Journal of the Optical Society of America*, Volume 63, pages 1281-1282, 1973), S. F. Monaco ("Reflectance of an Inhomogeneous Thin Film", *Journal of the Optical Society of America*, Volume 51 pages 280-282, 1961), and D. K. Edwards, J. T. Gier, K. E. Nelson and R. D. Roddick ("Spectral and Directional Thermal Radiation Characteristics of Selected Surfaces for Solar Collectors", *Solar Energy*, Volume VI, pages 1-8, 1962). The spectral selectivity of such coatings, namely high absorptance for solar energy and low emittance for infrared radiation, has been attributed to the effective gradient in refractive index which such surfaces exhibit. With this explanation, the high efficiency of such textured surfaces is based on optical rather than geometric considerations. The literature does not report any relationship, or lack thereof, between incident angle and efficiency in these effective refractive index gradient types of textured solar energy collecting surfaces.

With the foregoing prior art in mind, one other technical area should be noted. That is the field of electrodeposition of lead dioxide. The various textures of electrodeposited lead dioxide, dependent on deposition bath composition and conditions, have been reported to range, for example, from slightly coarse, to dull smooth, bright smooth, fibrous, columnar, rough, granular, and porous (Y. Shibasaki, "Textures of Electrodeposited Lead Dioxide", *Journal of the Electrochemical Society*, pages 624–628, November 1958).

Notwithstanding the foregoing, there remains the need for low cost, improved efficiency solar energy collector surfaces or surface coatings, and particularly to such coatings which are relatively efficient regardless of light incident angle, at least within some fairly wide range. It is this need to which the present invention is directed.

More specifically, it is the general object of the present invention to provide a solar energy collector coating which is relatively efficient through a wide range of incident angles.

Still more specifically, it is an object of the present invention to provide a textured lead dioxide solar energy collector surface, the geometric and optical properties of which are such that relatively high solar absorptance and relatively low infrared emissivity are attained through a wide range of incident angles.

Still another object of this invention is to provide a process for forming solar energy collector surface coatings which are relatively efficient through a wide range of incident angles.

These objects and others, which will be apparent in the course of the subsequent description of this invention, are met, briefly, by an electrodeposited lead oxide solar energy collector coating, of the general type disclosed and claimed in U.S. Pat. No. 3,958,554 but with a further specific characteristic of a physical form or micro texture comprising a multiplicity of oriented, more specifically outwardly protruding from the substrate, platelets, or relatively narrow and randomly shaped pyramids grown perpendicular to the surface. This invention also encompasses the method of formation of such coatings, namely by electrodeposition technique in which lead oxide is first nucleated on the substrate surface by a high overpotential for a short period of time and the outwardly oriented platelets are subsequently formed over a longer period of time with a lower overpotential. The textured lead oxide solar energy collector surface then encompasses the highly desirable optical properties of previously disclosed lead oxide collector surfaces, the effective refractive index gradient described in the literature with respect to textured surfaces of other materials, and the geometric effects of incident energy striking the side walls of a multiplicity of upwardly extending platelets. The net effect then is that of a highly efficient solar energy collector coating which is remarkably insensitive to the angle of incidence of the solar radiation.

Figure 2:
Figure 3:

For a better understanding of this invention, reference is made to the following detailed description thereof taken in conjunction with the appended claims and the drawings, in which:

FIG. 1 is a micro photograph of the normal texture of one lead dioxide solar energy collector coating formed in accordance with U.S. Pat. No. 3,958,554;

FIG. 2 is a micro photograph of a textured lead dioxide coating formed in accordance with the present invention; and FIG. 3 is a micro photograph, of the same material shown in FIG. 2, but at a higher magnification.

Referring first to FIG. 1, this micro photograph, at a magnification of 10,000 × illustrates an intermingled network of lead dioxide crystals formed in accordance with normal electrodeposition techniques as have previously been used to make solar energy collector coatings. This coating has a solar energy collector efficiency on the order of 99% at normal incidence angles but this efficiency drops off rapidly as the incident angle decreases.

FIGS. 2 and 3, micro photographs at magnifications of 10,000 × and 30,000 ×, respectively, illustrate the multiplicity of upwardly extending generally random pyramidal shapes of oriented platelets (sometimes referred to herein as crystals) formed in accordance with the method of and comprising the product of the present invention, as formed specifically in the example of the present invention set forth below. In general, the platelets, as shown, extend to a height of about 0.2 micrometers and have a surface density of about 6–8 platelets per square micrometer but heights up to 1 micrometer and platelet or crystal surface densities in the range 2–10 platelets (or crystals) per square micrometer would be considered usable. The spacing between platelets thus approaches the wavelength of visible light.

Inasmuch as the multiplicity of platelets in the coating of the present invention do not generally form a continuous protective coating over the substrate, i.e., the individual platelets do not necessarily touch at their base, corrosion protection of the underlying substrate may be provided by a first or intermediate coating, such as a previously deposited smooth and continuous lead dioxide electrodeposited from a tartrate bath as described in my copending application, Ser. No. 687,689. Obviously, such an undercoating is not necessary if the substrate is stainless steel but it may be highly necessary to prevent corrosion of a copper substrate in a high humidity environment.

The method of the present invention relates to the kinetics and growth stages in the lead dioxide electrodeposition system. In general, this system comprises first the formation of a double layer, followed by nucleation and growth and finally a steady state due to growth alone. Simultaneously nucleation and growth occur after reaching and maintaining some necessary overpotential, on the order of 200 millivolts or more. Typically, such growth is characterized by random hemispheres of a variety of sizes, indicating that the growth is non-preferential. Plating conditions, bath compositions, bath contaminants, leveling additives, etc., all effect the growth and shape characteristics in the system. It was under such conditions that Y. Shibasaki obtained the previously referenced lead dioxide macrotextures.

In accordance with the present invention it is found, however, that if initial prenucleation is provided by a short pulse, on the order of a few seconds at a high overpotential, the primary effect is the formation of nuclei of electrodeposited lead dioxide on the surface of the substrate. If this overpotential is then immediately dropped down to a low value, nucleation ceases but the preformed nuclei will uniformly grow as crystals or platelets outwardly from the surface. At low overpotentials, after such prenucleation and with a cold, dilute plating bath, in the absence of agitation, preferred orientation, namely outward growth of platelets to form the pyramidal structure previously described and illustrated, is achieved. It is evident that conditions generally regarded as favorable for electroplating are avoided in order to form the discontinuous crystalline platelets of this invention, which are achieved only by maintaining very slow growing conditions.

As a specific example of the present invention, a pure copper sheet substrate is first rendered corrosion resistant by lead dioxide electrodeposition from a tartrate bath as otherwise disclosed and claimed in co-pending (not allowed) U.S. patent application Ser. No. 687,689, filed May 19, 1976, of common inventorship and assignment herewith and the subject matter of which is hereby incorporated by reference. This copper sheet with lead dioxide corrosion resistant coating is then immersed in a second plating bath containing 50 grams per liter sodium hydroxide and 25 grams per liter lead monoxide. The second bath specifically excludes leveling and wetting agents or other additives and the bath is first pre-electrolyzed and filtered through activated carbon filters to remove any impurities. An electrolytic current of 6 milli amps per square centimeter (anodic current density) is then applied for less than 2 seconds after which the current is dropped to 3 milli amps per square centimeter for the remaining duration of the plating operation. It is expected that similar results would be obtained with current in the range of 4–8 milli amps for the first stage and 1–4 milli amps in the subsequent stage. Following this procedure in about 2 minutes, a coating with an average depth of about 0.08 microns was attained with the platelets ranging up to 0.2 micrometers in height and a platelet density, as previously indicated, on the order of 6–8 platelets per square micrometer. In general, the plating duration may be continued for an additional one to fifteen minutes depending on the desired thickness but the solar absorptivity (over 99.5% for sunlight) and infrared emissivity (30% or less), are quite independent of coating thickness after the initial 2 minute plating duration.

The optical value of solar absorptivity and infrared emissivity for coating produced in this example, as previously indicated, was about the same as that reported previously for other lead dioxide solar energy absorption coatings, at a normal incidence angle. However, the specific lead dioxide solar energy absorption coating of this invention showed a remarkable insensitivity to the angle of incident light. Thus, close to peak collection efficiencies were observed at angles of incidence from 45° to 90°, in contrast to the very short peak performance during noon time (roughly normal incidence angles) of present stationary flat plate collectors of various designs.

While this invention has been described with reference to specific eembodiments and a particular example, it will be obvious to those skilled in the art that other embodiments may be devised which are within the true spirit and scope of the present invention and that some departure from the specific dimensions and process conditions may be utilized without departing from the true spirit and scope of the present invention. For example, in the initial prenucleation electrodeposition stage, the over-voltage may range from 400 to 1,000 millivolts per square centimeter and the prenucleation time period may range from 1 to 5 seconds. In the same manner, the reduced overpotential for the subsequent growth stage in the electrodeposition process may range anywhere from 100 to 400 millivolts per square centimeter. This will depend, too, to some extent on the bath composition and the number and size of platelets desired. Various other lead dioxide electrodeposition baths may be used for this purpose, to the extent they are amenable to the separate prenucleation and growth stages of the overall process. Similarly, the substrate material may comprise any of a wide variety of conductive substrates. The appended claims are, of course, intended to encompass all such modifications of the present invention and deviations from the specific embodiments and examples described herein.

Having described my invention and the best embodiments thereof now known to me, I claim:

1. In the method of forming lead dioxide solar energy collector coatings by electrodeposition, the improvement comprising two stage electrodeposition, from a bath suitable therefor, by first depositing the lead dioxide at a relatively high overpotential to form nuclei at a multiplicity of random locations on the surface of the substrate followed by deposition at a reduced overpotential for a longer period of time to cause crystal growths outward from said preformed nuclei, said crystal growths comprising a multiplicity of upwardly pointing pyramidal shapes adapted to trap incident radiation to enhance the absorption thereof.

2. An improved process, as recited in claim 1, wherein said first nuclei-forming stage is maintained for a time period on the order of 1–5 seconds and said second crystal growth stage continues for a duration on the order of 1–15 minutes.

3. An improved process, as recited in claim 1, wherein said bath is essentially free of contaminants or additives and is maintained at a temperature below 30° C.

4. An improved process, as recited in claim 1, wherein the initial potential applies about 6 milliamps per square centimeter and the subsequent potential produces about 3 milliamps per square centimeter anodic current densities.

5. An improved process, as recited in claim 1, wherein the substrate used in said process is copper and a corrosion-resistant coating is first applied to said copper substrate.

6. An improved process, as recited in claim 1, wherein said staged electrodeposition process produces oriented upwardly extending, randomly shaped and disposed crystals up to 1.0 micrometers in height and with a surface density on the order of 2–10 crystals per square micrometer.

7. An improved process, as recited in claim 1, wherein said high overpotential is 400–1000 millivolts per square centimeter and said reduced overpotential is 100–400 millivolts per square centimeter.

8. An improved process for forming lead dioxide solar energy collector coatings by two stages electrodeposition from a bath suitable therefor comprising first depositing the lead dioxide at a relatively high overpotential to form nuclei at a multiplicity of random locations on the surface of the substrate followed by deposition at a reduced overpotential for a longer period of time to cause crystal growths outward from said preformed nuclei said crystal growths comprising a multiplicity of upwardly pointing pyramidal shapes adapted to trap incident radiation to enhance the absorption thereof, wherein said electrodeposition bath consists of sodium hydroxide and lead monoxide and the current density in the first nuclei-forming stage is on the order of 4–8 milliamps per square centimeter and the current density for said subsequent crystal growth stage is on the order of 1–4 milliamps per square centimeter.

9. An improved process, as recited in claim 8, wherein said high overpotential is 400–1000 millivolts per square centimeter and said reduced overpotential is 100–400 millivolts per square centimeter.

10. An improved process, as recited in claim 9, wherein said high overpotential is 400–1000 millivolts per square centimeter and said reduced overpotential is 100–400 millivolts per square centimeter.

* * * * *